United States Patent [19] [11] Patent Number: 4,968,784
Imai et al. [45] Date of Patent: Nov. 6, 1990

[54] PHENYLAZOPHENYLAZONAPHTHOL-SULFONIC ACIDS SUBSTITUTED BY A TRIAMINOTRIAZINE RADICAL

[75] Inventors: Hidenori Imai; Masahiro Hiraki, both of Urawa; Yoshiaki Shimizu, Nogi, all of Japan

[73] Assignee: Nippon Kayaku Kabushiki Kaisha, Tokyo, Japan

[21] Appl. No.: 359,148

[22] Filed: May 31, 1989

[51] Int. Cl.$^5$ .................. C09B 31/08; C09B 31/065; C09B 31/072; D06P 1/18
[52] U.S. Cl. ................................ 534/797; 534/582; 534/803; 534/887; 544/197; 106/22
[58] Field of Search ................ 534/797, 803

[56] References Cited

U.S. PATENT DOCUMENTS

| 4,273,707 | 6/1981 | Pedrazzi | 534/797 |
| 4,363,761 | 12/1982 | Pedrazzi | 534/803 |
| 4,367,172 | 1/1983 | Pedrazzi | 534/797 |
| 4,594,410 | 6/1986 | Pedrazzi | 534/803 X |

FOREIGN PATENT DOCUMENTS 2179361 3/1987 United Kingdom ............ 534/797

OTHER PUBLICATIONS

Hiraki et al., Chemical Abstracts, vol. 110, No. 77493k (1989).

Primary Examiner—Floyd D. Higel
Assistant Examiner—Fiona T. Powers
Attorney, Agent, or Firm—Henry C. Nields

[57] ABSTRACT

Disazo compounds represented by the following formula (I):

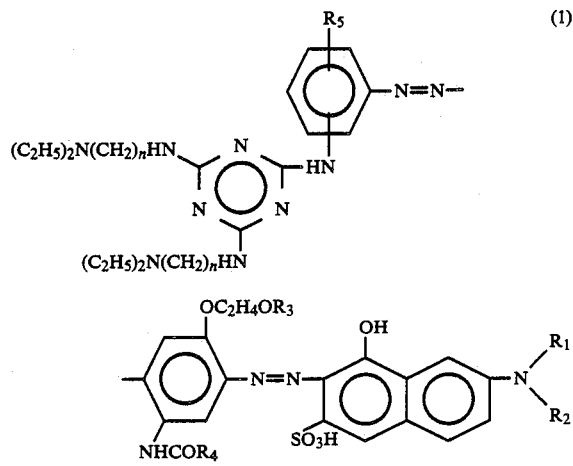

in which
$R_1$ and $R_2$ are hydrogen, $C_{1-3}$ alkyl, $C_{1-4}$ alkoxy $C_{1-3}$ alkyl, phenyl $C_{1-3}$ alkyl, phenoxy $C_{1-3}$ alkyl, hydroxy $C_{1-3}$ alkyl, cyano $C_{1-3}$ alkyl, $C_{1-4}$ alkoxyhydroxy $C_{1-3}$ alkyl or hydroxyphenoxy $C_{1-3}$ alkyl,
$R_3$ is $C_{1-4}$ alkyl,
$R_4$ is methyl or ethyl,
$R_5$ is hydrogen, chlorine, methyl or methoxy,
n is 2 or 3 respectively in the form of the free acid is disclosed and these present compounds are used for dyeing of various fibre materials, leather, wood, pulp and paper etc. in black shade and preparing of black ink for ink-jet, felt-pen and signpen etc. The present compounds have high color value, high affinity and high dyeing velocity on paper and excellent fastnesses.

4 Claims, No Drawings

PHENYLAZOPHENYLAZONAPHTHOLSULFONIC ACIDS SUBSTITUTED BY A TRIAMINOTRIAZINE RADICAL

BACKGROUND OF THE INVENTION

The present invention relates to a disazo compound and a process for dyeing a substrate therewith.

Although a large number of dyes are used for dyeing and printing of various fiber materials, leather, paper or pulp, few of them show satisfactory dyeing characteristics such as dyeing velocity and degree of exhaustion.

In particular, since the existing black dyes used for black dyeing of paper and pulp exhibit low dyeing velocity and degree of exhaustion, it is a problem that the deep black dyeings can be obtained only with difficulty, and also the water-fastness of the dyeings is unsatisfactory.

A rationalization of the processes used in the dyeing industry is more and more required, and from the point of view of reduction of dyeing time and environmental conservation in particular, the demand has arisen to develop such dyes of high dyeing velocity and degree of exhaustion as to give nearly colourless waste water from dyeing, and also exhibit excellent water-fastness of the dyeings. The amount of black dye to be used to obtain black dyeings runs to several times as much as compared to the dye of the other shades, so that the development of dyes which exhibit an excellent dyeing velocity and degree of exhaustion and also produce black dyeings of an excellent water-fastness is very urgently in demand.

The inventors of the present invention have intensively investigated to discover a black dye which yields excellent colour value (depth of shade), exhibits high dyeing velocity and degree of exhaustion, and possesses excellent water-fastness, or conducting dyeing and printing of various substrates, for example, fibre material, leather, wood, pulp and paper, and so have attained the present invention.

SUMMARY OF THE INVENTION

The present invention produces a disazo compound represented by the formula (1):

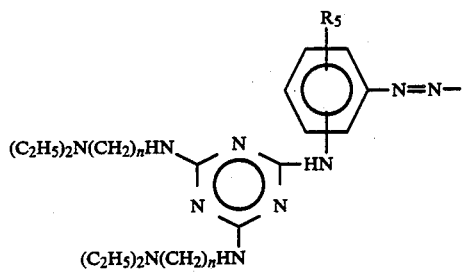

-continued

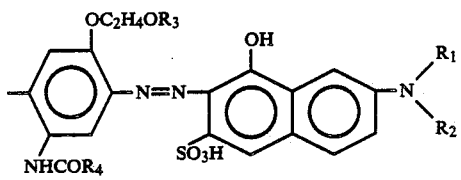

in which
R$_1$ and R$_2$ are hydrogen or C$_{1-3}$ alkyl which may be substituted by C$_{1-4}$ alkoxy, phenyl, phenoxy, hydroxy or cyano,
R$_3$ is C$_{1-4}$ alkyl,
R$_4$ is methyl or ethyl,
R$_5$ is hydrogen, chlorine, methyl or methoxy, and
n is 2 or 3, respectively,
in free acid form and gives a process for dyeing a substrate characterised by using said compound.

DETAILED DESCRIPTION OF THE INVENTION

The following is a detailed description of the disazo compound and the dyeing process of the present invention.

A disazo compound represented by the formula (1) is prepared, for example, as follows. That is, an amino compound of the formula (2):

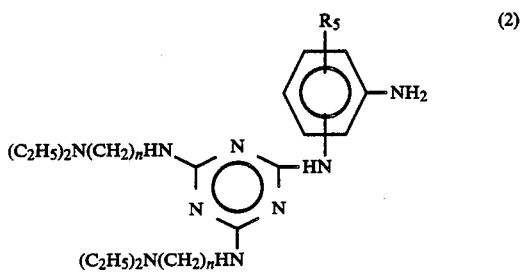

in which R$_5$ and n are as defined above, is diazotised and coupled to an anilino compound of the formula (3):

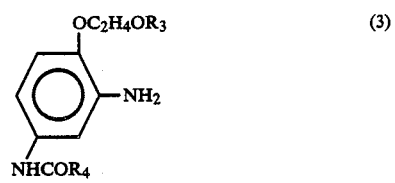

in which R$_3$ and R$_4$ are as defined above, to give a monoazo compound of the formula (4):

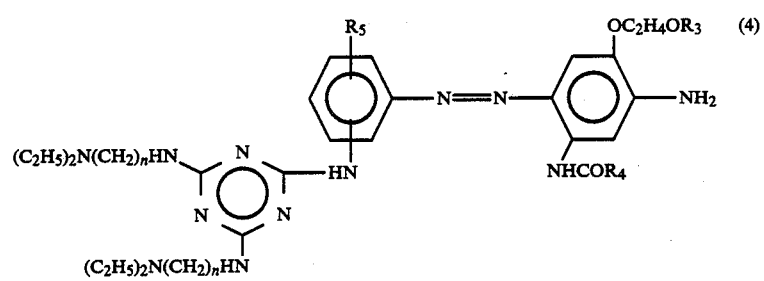

in which $R_3$, $R_4$, $R_5$ and n are as defined above. The monoazo compound obtained is further diazotised and coupled to naphthol sulfonic acids of the formula (5):

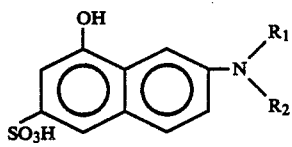

in which $R_1$ and $R_2$ are as defined above, to give a disazo compound of the formula (1).

The above-mentioned diazotisation and coupling can be conducted by known processes. For example, diazotisation is conducted in mineral acids at 0° to 25° C. with diazotising agents such as sodium nitrite, and coupling at 0° to 30° C. under pH value of 2 to 9. The product is isolated by a generally known process, and, if necessary, may be purified.

A disazo compound of the formula (1) according to the present invention includes 2 basic groups, and so treated by no less than stoichiometrical amount of inorganic acids such as hydrochloric acid, sulfuric acid, phosphoric acid or preferably of organic acids such as formic acid, acetic acid, lactic acid, citric acid, glycolic acid and methane sulfonic acid to give an acid-addition salt form of the disazo compound of the formula (1), which can be dissolved in water. The obtained aqueous solution may be used as such for dyeing of a substrate, or optionally be dried to a powder of an acid-addition salt with the disazo compound.

The above amino compound of the formula (2) can be prepared, for example, by condensing 1 mol of acetylaminoanilines to 1 mol of cyanuric chloride with 2 mol proportions of 3-diethylaminopropylamine or 2-diethylaminoethylamine in an optional order, and then hydrolysing the acetylamino group. Practical examples of the acetylaminoanilines used hereby include the following ones:
4-acetylaminoaniline, 3-acetylaminoaniline, 4-acetylamino-3-methoxyaniline, 4-acetylamino-3-methylaniline, 4-acetylamino-3-chloroaniline, 4-methoxy-3-acetylaminoaniline, 4-methyl-3-acetylaminoaniline, 4-chloro-3-acetylaminoaniline, 4-acetylamino-2-methoxyaniline, 4-acetylamino-2-methylaniline, 4-acetylamino-2-chloroaniline, 5-acetylamino-2-methoxyaniline, 5-acetylamino-2-methylaniline, 5-acetylamino-2-chloroaniline, etc.

Furthermore, when the corresponding nitroanilines are used in place of acetylaminoanilines, reduction is conducted in place of hydrolysis after the condensation in the similar manner to the above-mentioned to give the amino compound of the formula (2).

Practical examples of the anilino compounds represented by the formula (3) include the following ones:
5-acetylamino-2-methoxyethoxyaniline, 5-acetylamino-2-ethoxyethoxyaniline, 5-acetylamino-2-propoxyethoxyaniline, 5-acetylamino-2-butoxyethoxyaniline, 2-methoxyethoxy-5-propionylaminoaniline, 2-ethoxyethoxy-5-propionylaminoaniline, 2-propoxyethoxy-5-propionylaminoaniline and 2-butoxyethoxy-5-propionylaminoaniline.

In addition, practical examples of the naphtholsulfonic acids represented by the formula (5) include the following ones, of which every one is shown as a free acid, but they are not limited thereto.

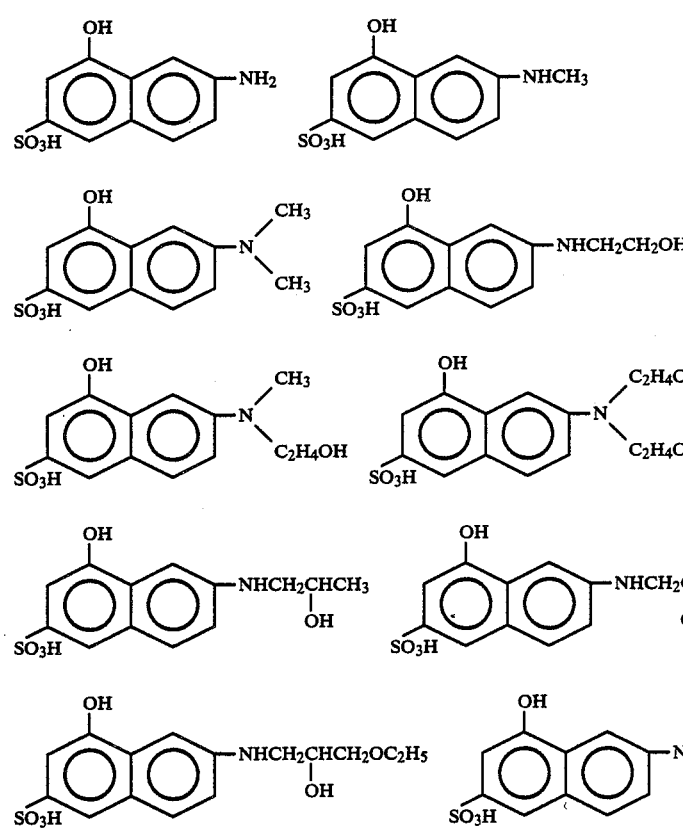

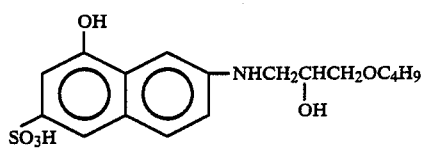 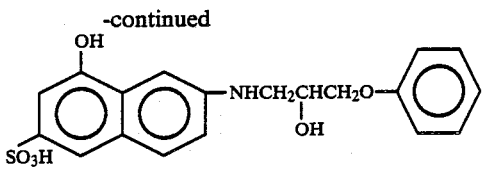

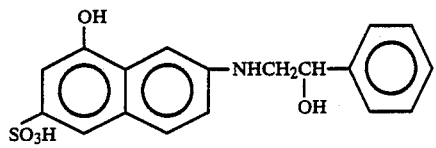 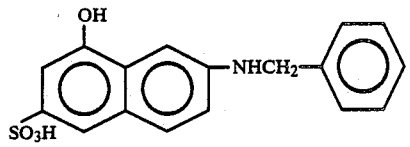

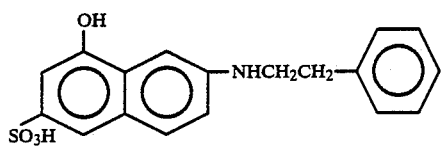 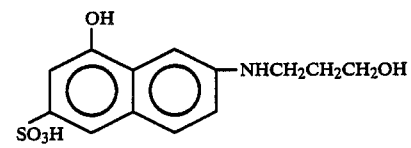

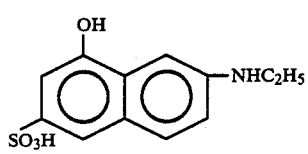 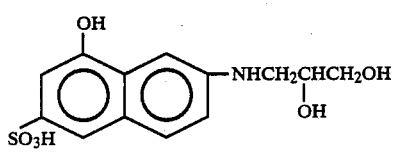

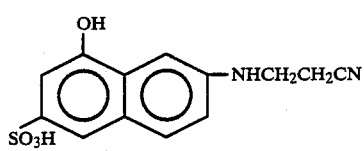

A disazo compound represented by the formula (1) is dried in form of an acid-addition salt as described above, or preferably without drying, in form of a concentrated solution containing the organic or inorganic acids described above, to serve dyeing of substrates. Finishing up to a concentrated solution can be conducted by a known method, for example, the one described in the Japanese Patent Publication no. 4879/1964. Namely, the solution may be prepared by adding a disazo compound of the formula (1) to an aqueous solution of the aforementioned inorganic, or preferably organic acids, if necessary, together with a water-soluble organic solvent. Auxiliaries, for example, activators, urea etc., may be optionally added hereby. As the water-soluble organic solvent to be used in this while, for example, ethylene glycol, diethylene glycol, triethylene glycol, polyethylene glycol, propylene glycol, dipropylene glycol, polypropylene glycol, butylene glycol, methyl cellosolve, carbitol, methylcarbitol, ethylene glycol dimethyl ether, ethylene glycol monobutyl ether, diethylene glycol monobutyl ether, triethylene glycol monobutyl ether, triethylene glycol monomethyl ether, propylene glycol monomethyl ether, butylpolyglycol, phenylglycol, hexylene glycol, thioglycol, glycerin, tetrahydrofuran, dioxane, butyrolactone, N-methyl-2-pyrrolidone, ε-caprolactam, formamide, dimethylformamide methyl alcohol and butyl alcohol may be mentioned. These water-soluble organic solvents may be used alone or in combination of two or more of them.

A dyeing process using a disazo compound of the formula (1) is described as follows.

A disazo compound of the formula (1) according to the present invention exhibits an excellent quality suitable to a black dyestuff to dye various fibre materials, leather, wood, pulp and paper etc., and also to a black colouring matter for preparation of colour ink to print substrates thereof. Substrates and dyeing processes thereof whereto the disazo compound of the formula (1) can apply will be demonstrated.

First, as fibre materials, for example, homopolymer and copolymer of acrylonitrile; acid-modified polyester; nitrogen-containing natural fibres such as silk and animal wool; various materials containing cellulose, that is, natural cellulosic fibres represented by cotton and regenerated cellulosic fibre; polyvinyl alcohol fibre and also glass fibre are included. Dyeing of these fibre materials with a disazo compound of the formula (1) may be conducted by the usual process, preferably by absorption dyeing in aqueous bath under conditions of pH value 3 to 8 and dyeing temperature from 60° to 130° C., or batch-wise or continuous processes such as spray coating, padding and printing with an aqueous ink. Any types of fibre material, such as filament, yarn, cloth, knitting and finished fabrics may be used hereby under no limitation. Application of a disazo compound of the formula (1) to these materials gives dyeings and prints of an extremely high colour value in deep black shade, which are provided with an extremely high degree of exhaustion and an excellent water-fastness also with a good light-fastness.

Next, a disazo compound of the formula (1) may be used most preferably to dye pulp and paper. That is, batch wise and continuous dyeing of various kinds of bleached or unbleached pulp and paper, sized or unsized, according to absorption (beater dyeing), surface dyeing (addition to coat and size-press solution), padding, printing and spraying. A disazo compound of the formula (1) exhibits a large dyeing velocity and high degree of exhaustion also on the pulp and paper untreated by sizing, such as napkin, table cloth and hygienic paper. Such a high exhaustion makes a waste-water nearly colourless in absorption dyeing, so it is an extraordinary advantage about waste-water regulation and environmental conservation. These pulp and paper may be dyed with a usual process, for example, at pH 3 to 8, in particular 4 to 7, at dyeing temperature of 10° to 50° C., preferably 15° to 35° C. The obtained dyeings on paper or pulp are provided with a deep shade of black of high colour value, and exhibit an excellent light- and water-fastness. In relation to the excellent water-fastness, migration from dyed paper to white paper can be hardly observed, for example, when dyed paper comes into contact with moistened white paper under pressure at an ordinary temperature. Since an excellent fastness is observed also in contact with alum, alkali, acid and alcohol, a disazo compound of the formula (1) according to the present invention may be used most preferably in a field of deep black papers such as napkin, table cloth and hygienic paper, on which "blotting of colour" is particularly troublesome.

Furthermore, a disazo compound of the formula (1) exhibits extremely high affinity and dyeing velocity on paper, so that it may be applied also by a conventional procedure to the ink for ink-jet printing and stationary such as felt-pen and signpen, by which a record on paper is intended. For example, ink for ink-jet printing is prepared by mixing together usually 0.1 to 20%, preferably 1 to 10% of a compound of the formula (1), 5 to 80% of a water-soluble organic solubilizing agent, for example, monoethanolamine, diethanolamine, triethanolamine, N-methylpyrrolidone, N-ethylpyrrolidone, ethylene glycol, polyethylene glycol, propylene glycol, polypropylene glycol, ethylene glycol monomethyl ether, diethylene glycol monomethyl ether, 2-pyrrolidone, ε-caprolactam, δ-valerolactam and water-soluble nylon and 10 to 90% of water, if necessary, with an organic or inorganic acid such as acetic, formic or hydrochloric acids, wetting agents such as lithium chloride or glycerin, surface active agents and fungicides, and further if neccessary, by filtering (percentages are by weight of total ink).

In addition, a disazo compound of the formula (1) may be applied to dyeing leather and wood by absorbing, spraying, brush-coating or printing. For example, in the absorption dyeing process of leather, dyeing is conducted in dyebath containing a disazo compound of the formula (1) at temperature of 30° to 70° C. and pH value of 3 to 8 for 15 to 60 minutes, and after the subsequent fatting with an usual process, washing with water and drying are followed. On absorption dyeing of wood, it is immersed in dye bath at 20° to 130° C. for a given hour, then taken out therefrom, washed with water and dried.

A disazo compound of the present invention is provided with an extremely high dyeing velocity, degree of exhaustion and depth of dyed shade, and gives an extremely excellent light- and water-fastness on substrates dyed or coloured thereby. In addition, it shows a favorable result in a mutagenicity test.

A disazo compound provided with very high dyeing velocity, degree of exhaustion and depth of shade on a substrate and giving good light- and water-fastnesses to the substrate dyed or coloured thereby was obtained.

The present invention will be illustrated in more detail by Examples, in which parts are the ones by weight, all percentages are weight percentages and sulfonates are shown as free acid.

EXAMPLE 1

9.7 parts of 4-[2′, 4′-bis (3″-N,N-diethylaminopropylamino)-s-triazin-6′-ylamino]aniline were dissolved in 110 parts of water and 9.1 parts of 35% hydrochloric acid, and diazotised with 1.5 parts of sodium nitrite (3.8 parts as 40% solution) at 0° to 5° C. for 30 minutes. Apart from this, 4 parts of 35% hydrochloric acid and 4.9 parts of 5-acetylamino-2-methoxyaniline were added to 25 parts of water and dissolved to a solution, which was added to the solution of the above diazonium salt and stirred for 30 minutes. Then it was adjusted to pH 4.0 by adding sodium carbonate solution and stirred at 15° to 20° C. for 6 hours. Subsequently 3 parts of 35% hydrochloric acid were added to the reaction solution and 1.6 parts of sodium nitrite (4.0 parts as 40% solution) also added thereto, to diazotise at 5° to 10° C. decomposed with sulfamic acid to give a diazo solution. On the other hand, 5.6 parts of 7-N-methylamino-1-naphthol-3-sulfonic acid were dissolved in 130 parts of water at 60° C., and adjusted with sodium hydroxide to pH 10.0 of the solution, to which the solution of the aforementioned diazonium salt was added at 5° to 10° C. in the course of 30 minutes, while keeping pH 8.0 with sodium carbonate solution, and further stirred for 3 hours. Thereafter, sodium hydroxide solution was added gradually to adjust pH value to 11.0, and a precipitated product was isolated and dried. This dry product was added to a mixture of 70 parts of water, 25 parts of lactic acid and 20 parts of urea, then heated at 80° C. to dissolution. After an insoluble matter was filtered off, 140 parts of concentrate solution of good stability, containing 17.8 parts of a diazo compound represented by the formula (6) were obtained. λmax.598 nm (in 40% acetone, 10% aqueous acetic acid).

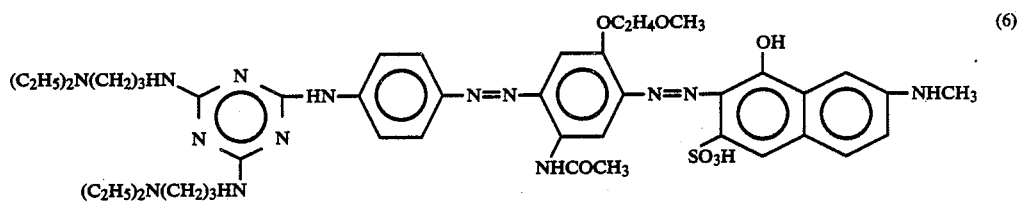

(6)

EXAMPLE 2

9.7 parts of 4-[2′, 4′-bis(3″-N,N-diethylaminopropylamino)-s-triazin-6′-ylamino]aniline were dissolved in 110 parts of water and 9.1 parts of 35% hydrochloric acid and diazotised with 1.5 parts of sodium nitrite (3.8 parts as 40% solution) at 0° to 5° C. for 30 minutes. On the other hand, 4 parts of 35% hydrochloric acid and 5.2 parts of 5-acetylamino-2-ethoxyethoxyaniline were added to 25 parts of water and dissolved thereby to a solution, which was added to the solution of the above diazonium salt and stirred for 30 minutes. Then it was adjusted to pH 4.0 by adding sodium carbonate solution, and stirred at 15° to 20° C. for 6 hours. 3 parts of 35% hydrochloric acid were added to the solution, and diazotisation was conducted with 1.6 parts of sodium nitrite (4.0 parts as 40% solution) at 5° to 10° C. for 1 hour. Subsequently an excess of nitrous acid was decomposed by adding sulfamic acid. 6.2 parts of 7-(β-hydroxyethylamino)-1-naphthol-3-sulfonic acid were dissolved in 140 parts of water at 50° C. with sodium hydroxide to pH 10.0 to a solution, to which the above solution of diazonium salt was added at 5° to 10° C. in the course of 30 minutes while keeping pH 8.0 with sodium carbonate solution, and further stirred for 3 hours. After that, sodium hydroxide solution was gradually added thereto to adjust pH value to 11.0, and a preciptated product was isolated. It was added into a mixture of 60 parts of water, 25 parts of acetic acid and 15 parts of urea, and heated to 80° C. to dissolution. After an insoluble matter was filtered off, 139 parts of a concentrate solution of good stability, containing 18.7 parts of a disazo compound represented by the formula (7) were obtained. λmax. 599 nm (in 40% acetone, 10% aqueous acetic acid).

diluted by adding 96700 parts of water, and paper was made therefrom on a sheater according to the usual process. Colouring of a waste water from the paper making process was hardly observed, and the obtained paper was dyed in a deep black shade of a high colour value, provided with an excellent water-fastness and good light-fastness.

EXAMPLE 5

100 parts (dry weight) of hard wood bleached kraft pulp were ground with 3300 parts of water in a beater to 35° SR freeness. 15.7 parts of a concentrate solution obtained in Example 1, containing 2.0 parts of a compound of the formula (6), were added to the above pulp solution, stirred well for 5 minutes, and adjusted to pH 7.0 by adding soda ash solution. 0.5 part of cationic starch (CATO F, manufactured by Oji-National KK) was added thereto, and stirred for 5 minutes, and then 0.1 part, calculated in terms of solid material, of a size derived from alkylketene dimers (Hercon 40B, manu-

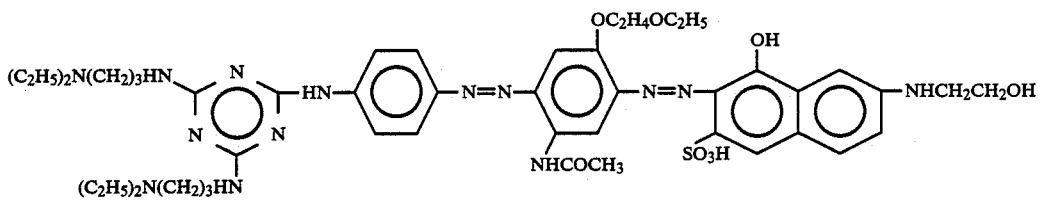

EXAMPLE 3

A dry material consisting of 50 parts of bleached sulfite pulp obtained from pinewood and 50 parts of bleached sulfite pulp obtained from birchwood was ground in 5000 parts of water by means of a beater to 30° Schopper-Riegler (SR) Freeness. 15.7 parts of a concentrate solution manufactured in Example 1, containing 2.0 parts of a compound of the formula (6), were added to the pulp solution and mixed. The obtained mixture was stirred for about 5 minutes, and after 1 part of rosin size and 2 parts of crystalline aluminium sulfate were added thereto, further stirred for 5 minutes. Subsequently it was diluted by adding 95000 parts of water, and paper was made therefrom on a sheater according to the usual process. Colouring of a waste water from paper making was hardly observed, and the obtained paper was dyed in a deep black shade of a high colour value, provided with an excellent water-fastness and good light-fastness.

EXAMPLE 4

100 parts (dry weight) of bleached sufite pulp obtained from pinewood was ground in 3300 parts of water by means of a beater to 35° SR Freeness. 14.9 parts of a concentrated solution manufactured in Example 2, containing 2.0 parts of a compound of the formula (7), were added to the pulp solution and mixed. The obtained mixture was stirred for about 5 minutes, then factured by DIC-Hercules KK) was further added and stirred for 10 minutes. It was diluted by adding 96700 parts of water, to make paper by the usual process. Colouring of a waste water from paper making was hardly observed, and the obtained paper was dyed in a deep black shade, provided with a good light-fastness and an excellent water-fastness.

In addition, when 100 parts of unbleached sulfite pulp obtained from pinewood were used, deep black dyeings of good light- and water-fastness were obtained in the similar manner to the above.

EXAMPLE 6

18.8 parts of a disazo compound represented by the formula (8)

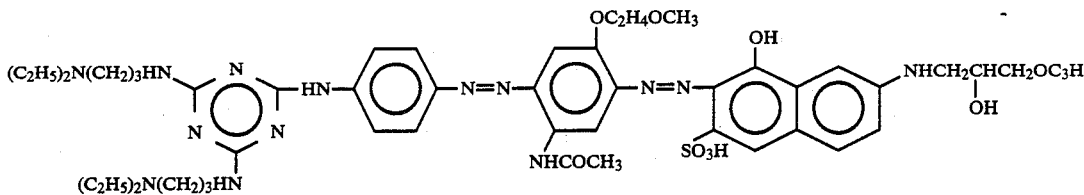

were added to a mixture of 71.2 parts of water, 25 parts of acetic acid and 20 parts of ethylene glycol and dissolved by heating at 80° C. to give 135 parts of a concentrate solution of good stability. λmax. 598 nm (in 40% acetone, 10% aqueous acetic acid).

Paper untreated by size was immersed in a solution of 14.4 parts of the above concentrate solution containing 2.0 parts of a compound of the formula (8), 0.5 part of starch and 85.1 parts of water at 20° to 30° C. for 2 to 3 seconds. An excess of aqueous solution was squeezed through 2 rollers, then the product was dried at 60° to 80° C. The obtained dyed paper was provided with a deep black shade of high colour value, showed scarcely any bleeding of dye owing to moisture, and exhibited a good light-fastness.

EXAMPLE 7

3 parts of a disazo compound represented by the formula (9).

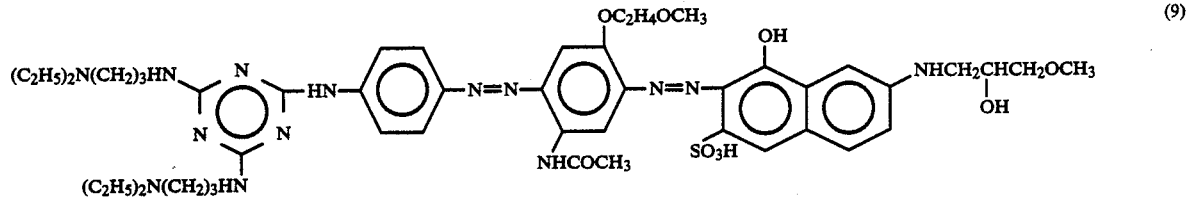

were added to a mixture of 4 parts of lactic acid 30 parts of diethylene glycol and 63 parts of ion-exchanged water and dissolved by heating to produce an aqueous ink. λmax. 598 nm (in 40% acetone, 10% aqueous acetic acid).

Paper treated by neutral sizing was typewritten with the above aqueous ink by using a felt pen. The typewritten letter was provided with a deep black shade of high colour value and exhibited good light- and water-fastnesses.

When paper treated by acid sizing was typewritten in place of the above paper treated by neutral sizing, good light- and water-fastnesses were obtained also.

EXAMPLE 8

18 parts of a disazo compound represented by the formula (10)

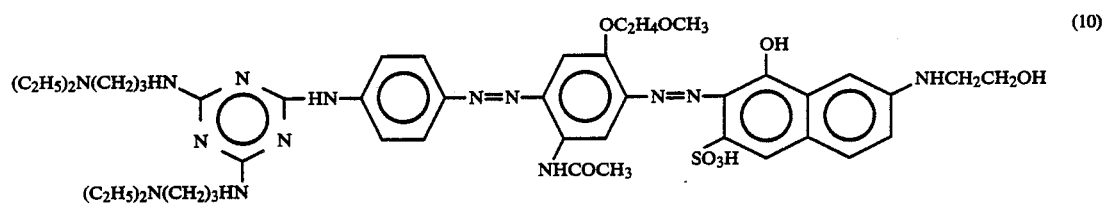

were added to a mixture of 74 parts of water, 25 parts of formic acid and 20 parts of diethylene glycol monobutyl ether, and dissolved by heating at 80° C. to give 137 parts of a concentrate solution of good stability. λmax. 599 nm (in 40% acetone, 10% aqueous acetic acid).

100 parts of vegetable-tanned pig leather were put into a dyebath comprising 250 parts of water of 50° C. and 4.6 parts of the above concentrate solution containing 0.6 part of a compound of the formula (10), and stirred for 30 minutes, then treated in the same bath with 10 parts of an anionic fatty liquor based on sulfonated train oil for 60 minutes. The leather is then dried, giving a dyed leather of deep black shade of high colour value. The dyed leather was provided with very good light- and wash-fastnesses.

EXAMPLE 9

5 parts of scoured and bleached cotton broadcloth were laid in 100 parts of water bath containing 3.1 parts of the concentrate solution described in Example 1 (containing 0.4 part of a compound of the formula (6)), and while the dyebath and dyeing material were stirred the temperature was raised to 100° C. during 20 minute, and the temperature held for 40 minutes. The compound in the dyebath was almost completely exhausted by cotton broadcloth, and the latter was dyed in deep black shade. The dyeing exhibited good light- and water-fastnesses. Viscose rayon and cupro fabrics also were dyed similarly in deep black shade of good light- and water-fastness.

EXAMPLES 10 to 32

The disazo compounds shown in Table were prepared in the similar process to Examples 1 and 2. The following Table shows disazo compounds represented by the formula (1) in free acid form, λmax.(in 40% acetone, 10% aqueous acetic acid) thereof in form of addition salt with acetic acid and the shade of paper dyed thereby in the manner similar to Example 3.

| Example | Disazo compound of the formula (I) | $\lambda_{max}$ (nm) | shade |
|---|---|---|---|
| 10 | (C$_2$H$_5$)$_2$N(CH$_2$)$_3$HN–[triazine(NHN(CH$_2$)$_3$N(C$_2$H$_5$)$_2$)]–NH–C$_6$H$_4$–N=N–C$_6$H$_3$(OC$_2$H$_4$OCH$_3$)(NHCOCH$_3$)–N=N–naphthalene(OH)(SO$_3$H)(NH$_2$) | 580 | black |
| 11 | (C$_2$H$_5$)$_2$N(CH$_2$)$_3$HN–[triazine(NHN(CH$_2$)$_3$N(C$_2$H$_5$)$_2$)]–NH–C$_6$H$_4$–N=N–C$_6$H$_3$(OC$_2$H$_4$OC$_2$H$_5$)(NHCOCH$_3$)–N=N–naphthalene(OH)(SO$_3$H)(NH$_2$) | 581 | " |
| 12 | (C$_2$H$_5$)$_2$N(CH$_2$)$_3$HN–[triazine(NHN(CH$_2$)$_3$N(C$_2$H$_5$)$_2$)]–NH–C$_6$H$_4$–N=N–C$_6$H$_3$(OC$_2$H$_4$OC$_3$H$_7$)(NHCOCH$_3$)–N=N–naphthalene(OH)(SO$_3$H)(NHCH$_3$) | 597 | " |
| 13 | (C$_2$H$_5$)$_2$N(CH$_2$)$_3$HN–[triazine(NHN(CH$_2$)$_3$N(C$_2$H$_5$)$_2$)]–NH–C$_6$H$_4$–N=N–C$_6$H$_3$(OC$_2$H$_4$OC$_4$H$_9$)(NHCOCH$_3$)–N=N–naphthalene(OH)(SO$_3$H)(NHCH$_3$) | 598 | " |
| 14 | (C$_2$H$_5$)$_2$N(CH$_2$)$_3$HN–[triazine(NHN(CH$_2$)$_3$N(C$_2$H$_5$)$_2$)]–NH–C$_6$H$_4$–N=N–C$_6$H$_3$(OC$_2$H$_4$OCH$_3$)(NHCOC$_2$H$_5$)–N=N–naphthalene(OH)(SO$_3$H)(NHCH$_2$CH$_2$OH) | 599 | " |

-continued

| Example | Disazo compound of the formula (I) | $\lambda_{max}$ (nm) | shade |
|---|---|---|---|
| 15 | | 598 | black |
| 16 | | 598 | " |
| 17 | | 600 | " |
| 18 | | 601 | " |
| 19 | | 601 | " |

| Example | Disazo compound of the formula (I) | $\lambda_{max}$ (nm) | shade |
|---|---|---|---|
| 20 | (structure) | 598 | black |
| 21 | (structure) | 598 | " |
| 22 | (structure) | 599 | " |
| 23 | (structure) | 597 | " |
| 24 | (structure) | 599 | " |

-continued

| Example | Disazo compound of the formula (I) | $\lambda_{max}$ (nm) | shade |
|---|---|---|---|
| 30 | | 599 | black |
| 31 | | 598 | " |
| 32 | | 580 | " |

EXAMPLE 33

| | | |
|---|---|---|
| Ion-exchanged water | 64 g | |
| N-methyl-2-pyrrolidone | 30 g | |
| Lactic acid | 2 g | |
| Compound of the formula (6) | 4 g | |
| | Total | 100 g |

After the above components were mixed together in a vessel and well dissolved, the mixture was filtered under pressure through a Teflon filter with a pore diameter $1\mu$. Then the filtrate was degasified by means of a vacuum pump to produce a recording ink. Subsequently, this recording ink was used in an ink-jet colour printer IO-700 (manufactured by Sharp Co) to print a printed matter. The obtained print exhibited an excellent light-fastness and also resulted in an excellent resistance to water.

We claim:

1. A disazo compound represented by the following formula (I):

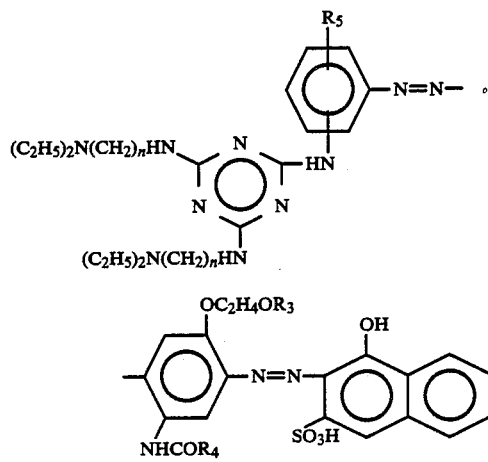

in which
  $R_1$ and $R_2$ are hydrogen, $C_{1-3}$ alkyl, or $C_1$ alkyl which is substituted by $C_{1-4}$ alkoxy, phenyl, phenoxy, hydroxy or cyano,
  $R_3$ is $C_{1-4}$ alkyl,
  $R_4$ is methyl or ethyl,
  $R_5$ is hydrogen, chlorine, methyl or methoxy,
  n is 2 or 3 respectively in the form of the free acid.

2. A disazo compound, according to claim 1, which is represented by the formula:

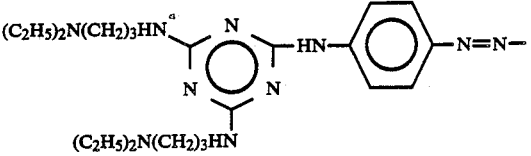

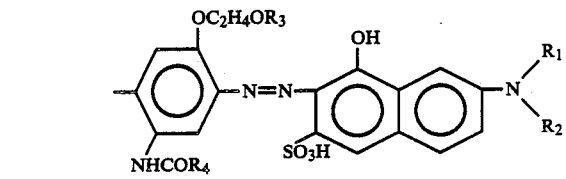

3. A disazo compound, according to claim 2 which is represented by the formula:

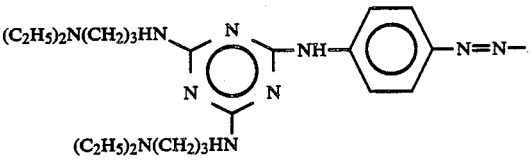

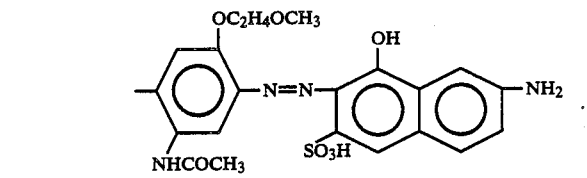

4. A disazo compound, according to claim 2, which is represented by the formula:

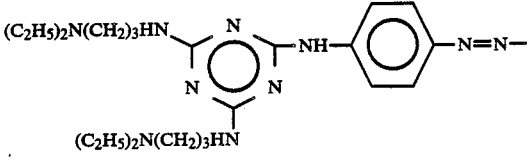

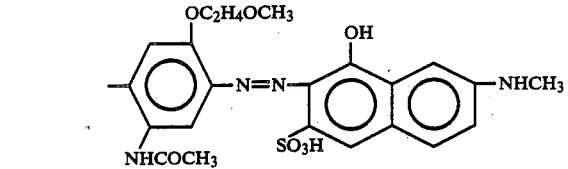

* * * * *

UNITED STATES PATENT AND TRADEMARK OFFICE
CERTIFICATE OF CORRECTION

PATENT NO. : 4,968,784

DATED : November 6, 1990

INVENTOR(S) : Hidenori Imai, Masahiro Hiraki and Yoshiaki Shimizu

It is certified that error appears in the above-identified patent and that said Letters Patent is hereby corrected as shown below:

Column 21, line 45, after "hydrogen, $C_{1-3}$ alkyl, or" and before "which", delete "$C_1$, alkyl" and substitute therefor --$C_{1-3}$ alkyl--

Signed and Sealed this

Tenth Day of March, 1992

Attest:

HARRY F. MANBECK, JR.

Attesting Officer        Commissioner of Patents and Trademarks